Patented Nov. 16, 1943

2,334,401

UNITED STATES PATENT OFFICE 2,334,401

FOOD PRODUCT AND METHOD OF MAKING

William J. Fitzpatrick, Chicago, Ill., and Harold H. Wagner, Cincinnati, Ohio, assignors to The W. J. Fitzpatrick Company, Chicago, Ill., a corporation of Illinois No Drawing. Application July 8, 1939, Serial No. 283,378

3 Claims. (Cl. 99—15)

This invention relates to food products containing phosphatides and more particularly to the efficient distribution of relatively small amounts of phosphatides through relatively large amounts of food products.

It is well known in the art that the addition of phosphatides in the form of lecithin to various food products produces very desirable effects. For example in baked goods it has been found that the addition of a small amount of lecithin to the dough increases the yield of the baked products and gives a more uniform porous structure, a good crust formation and better retention of freshness. The addition of a small amount of lecithin to shortening increases its creaming qualities, prevents any tendency to spot or streak after standing and increases the effectiveness of the shortening. In other food products similar beneficial results are obtained by the use of a small amount of lecithin.

While the advantages of lecithin in various food products are well understood, its use has been somewhat restricted due to the difficulty of properly incorporating the relatively minute amount of lecithin which can advantageously be used into the other ingredients making up the products. Commercial lecithin is principally derived from the soybean and is usually marketed as a semi-solid mass varying in physical characteristics from a thick waxy to a tacky viscous state containing from about 40% to 75% phosphatides and about 60% to 25% oil. Because of the physical characteristics of this product it cannot be readily mixed with other ingredients in baking or preparation of other food products in such a way as to be effectively distributed through the ingredients. For example, in baking such a long mixing process would be required to effect a distribution of the lecithin as to impair the dough.

Very small quantities of lecithin are used and for it to be fully effective it is essential to obtain an even distribution throughout the ingredients going into the make-up of the food products. Also, the consistency of various lots of lecithin will vary considerably, requiring a different type of mixing operation and making standardization of the mixing operation difficult.

One method of facilitating distribution of a small amount of lecithin throughout a relatively large bulk of food product has been to employ a relatively large amount of flour as a carrier. The use of this preparation has been limited, of course, to those food products in which flour is not an objectionable ingredient. When flour is used as a carrier of lecithin in a food product, particularly in bread and other bakery goods, the particles of carrier flour seem to hold the lecithin too tenaciously to permit its free action and efficient distribution throughout the product.

It has also been proposed to prepare emulsions of lecithin to facilitate its distribution, but such emulsions are difficult to prepare and even when stable, promote rancidity of the lecithin and have been objectionable on that account. Moreover, the emulsifying agents have been limited to those permissible in food products, thereby excluding the more efficient emulsifying agents.

Mixtures of lecithin with the shortening to be used in food products have also been proposed but the relatively small amount of lecithin which it is practicable to use places limitations on the improvements which can be obtained from lecithin when used in the proper quantities.

One of the objects of the present invention is to provide a method for easily and conveniently adding lecithin to the other ingredients used in food products, particularly in the baking field.

Another object of the invention is to provide a means whereby the lecithin added to the other ingredients in baking is made available immediately after its incorporation, and its desirable effects are thus obtained without requiring a mixing operation longer than is permissible in baking practice.

Another object of the invention is to provide a method whereby the lecithin used in baking has greater efficiency and produces results which are an improvement upon using the lecithin in in any other manner.

Other objects of the invention relate to the preparation of water soluble food material which carries lecithin to be incorporated as an ingredient in other food products.

The nature of the invention may readily be understood by reference to one illustrative product and its method of manufacture and use described below.

Our invention is based on the discovery that lecithin can be easily and uniformly mixed with all types of granular water soluble materials which are universally used in food products and baking with the lecithin carried in finely divided particles on the surface of the materials. When this material is mixed into food products the carrier particles dissolve and further subdivide and disperse the lecithin and carry it into intimate contact with the food ingredients on which it acts. Preferably the carrier should be of such nature as to carry the lecithin only on its surface, thereby limiting the amount of lecithin carried by each particle and in that way increasing the subdivision of the lecithin on dissolution of the carrier particle.

Finely divided salt, sugars such as beet, cane or corn sugars and similar soluble materials which are universally used in food products can be employed to advantage as carriers. Salt is particularly advantageous as a carrier since it is used almost universally in food products. In carrying out one embodiment of our invention a soluble food material such as salt is first mixed with the lecithin to form a greasy mass. This mass is then subjected to a thorough mixing operation which distributes the lecithin on the salt. Some of the salt crystals appear to be covered with a partial film of lecithin. Others have very small particles of lecithin adhering to the surface, but in either case the lecithin is distributed uniformly throughout the entire mass.

This material may readily be mixed in any desired quantity with other ingredients going into the makeup of food products and will be evenly distributed throughout the mixture. Upon exposure to water the salt or other food material dissolves very rapidly, leaving the lecithin in finely divided globules dispersed evenly through the mixture. Thus the lecithin is provided in readily available form in all parts of the mixture and can act rapidly and evenly thereon. This effect has been observed under a microscope by dissolving in water salt crystals mixed with lecithin according to the invention, the lecithin appearing as very minute globules distributed through the solution.

According to one specific example, we mix roughly but thoroughly common table salt and lecithin in the ratio of 25 parts salt to one part commercial lecithin by weight. As previously stated, commercial lecithins will vary somewhat in lecithin content. One satisfactory commercial lecithin is sold under the trade name "Margo" and contains approximately 65 per cent lecithin and 35 per cent soybean oil. Other commercial lecithins have been found to be equally satisfactory. The mixture of salt and lecithin produces a greasy mass which is then subjected to a distributing operation. Various types of mixers or grinders may be used for this operation. We have obtained excellent results by passing the mass through the comminuting machine more particularly described and claimed in the copending application of Harold H. Wagner, Serial No. 272,208, filed May 6, 1939, although other machines probably are equally as satisfactory. This operation distributes the lecithin uniformly on the salt and serves simultaneously to grind or break up the salt crystals, resulting in an increase in the number of crystals.

The resulting product is a granular mass of relatively fine salt crystals carrying the lecithin uniformly distributed throughout its mass. The crystals have a dry feel and exhibit little or no tendency to lump or pack. Proportions of salt and lecithin obviously may be varied within wide limits as desired to obtain particular effects. We have obtained unusually good results with the above mixtures containing 25 parts of salt to one part of commercial lecithin. The material may be handled as a dry granular mass and may be stored for long period without adverse effects.

The product of our invention, referred to herein as lecithinated salt, may be used in all food products where it is desired to use salt and lecithin. The product may be added to the other ingredients in the same manner in which salt is now added. Thus no new steps are required in the preparation of the food products. The salt contains a definite known percentage of lecithin, and no weighing or measuring operations are required other than are now used for measuring the salt. In some operations the salt is mixed with dry ingredients which are subsequently mixed with liquids. In others the salt is added to the moist mixture of other dry ingredients and liquids. In still other cases the salt is dissolved in a liquid before it is added to the mixture to produce a suspension of very small lecithin globules in the liquid. Any of these methods is effective for obtaining the desirable properties imparted by the lecithin.

It is known that it is comparatively easy to distribute salt in the other ingredients used in baking. This is probably due to the fact that the salt is soluble in water. Since the lecithin is evenly distributed on the salt, it immediately becomes evenly distributed throughout the mixture, and all of it is made available at once for starting the desirable effects which it has on the resulting dough. Salt is used universally in baking for its own desirable characteristics, and adding the lecithin with the salt adds no inert or undesirable material, nor does it add any additional step in the mixing operation, nor does it add to the number of ingredients used since the lecithin and salt are combined as one ingredient.

One use for which the lecithinated salt is particularly advantageous is in bakery products such as bread. For this purpose it may be incorporated in the dough in place of the usual amount of ordinary salt used. It has been found that the lecithin accentuates the flavor of the salt. In some cases, therefore, it is possible to reduce the usual proportions of salt slightly. Since the lecithinated salt may be handled as a dry granular mass, the amount of lecithin desired to be used may be easily measured and uniformly dispersed through the dough and is almost immediately available due to the solution of the salt.

Bread made with our lecithinated salt has a uniform close grained cell structure and has a soft silky texture which is considered very desirable by bakers. The general appearance of the loaf is better. It has a rich, brown appearance with a more uniform coloring. Bread made with our lecithinated salt stays soft and fresh longer than bread made without the lecithin. We believe this is due to the cell structure described above. Also, bread made with our lecithinated salt requires less dusting flour as it passes through the machine operations used in commercial baking. Bakers find it necessary to use a small amount of flour dusted on the rolls to prevent the dough from sticking and the use of the lecithinated salt seems to overcome this to a large extent so that less flour is required for dusting.

Our lecithinated salt may also be used in salad dressings such as mayonnaise, canned soups or meat stocks, cooked canned meats, various types of candy, and in fact in any food product in which salt is used and it is desired to use lecithin. In every case it is easier to use our lecithinated salt because the salt becomes uniformly distributed quickly because of its solution in the water or other liquid present, and apparently it acts as a carrier for uniformly distributing the lecithin at the same time. For use in products in which no salt is desired, other food materials such as sugar may be used, and the lecithinated sugar is made in the same manner as described for making the lecithinated salt.

We believe the advantages of the present invention are based largely on the solution of the salt or other food material, leaving the lecithin free in the form of finely divided globules distributed throughout the food product in such a way that it can efficiently perform its well known functions which result in the benefits noted above.

While several specific examples of the invention have been described in detail, it will be understood that they are for the purpose of illustration only and are not to be taken as a definition of the scope of the invention, reference being had for this purpose to the appended claims.

We claim:

1. The method of preparing a lecithinated food product in the form of a dry granular mass which comprises forming a rough mixture of commercial lecithin and a granular water soluble food material to form a greasy mass and subjecting the greasy mass to a grinding operation simultaneously to reduce the size of the granules and to distribute the lecithin uniformly thereover.

2. The method of preparing a lecithinated food product in the form of a dry granular mass which comprises forming a rough mixture of commercial lecithin and granular salt to form a greasy mass and subjecting the greasy mass to a grinding operation simultaneously to reduce the size of the granules and to distribute the lecthin uniformly thereover.

3. The method of preparing a lecithinated food product in the form of a dry granular mass which comprises forming a rough mixture of commercial lecithin and granular sugar to form a greasy mass and subjecting the greasy mass to a grinding operation simultaneously to reduce the size of the granules and to distribute the lecithin uniformly thereover.

WILLIAM J. FITZPATRICK.
HAROLD H. WAGNER.